United States Patent [19]

Smith et al.

[11] Patent Number: 4,726,674
[45] Date of Patent: Feb. 23, 1988

[54] FILM MAGAZINE PIN REGISTRATION

[75] Inventors: Harry L. O. Smith, Cleveland; Anthony G. Fox, Signal Mountain, both of Tenn.

[73] Assignee: Beattie Systems, Inc., Cleveland, Tenn.

[21] Appl. No.: 866,385

[22] Filed: May 23, 1986

[51] Int. Cl.⁴ .............................................. G03B 17/00
[52] U.S. Cl. .................................................. 354/203
[58] Field of Search ............... 354/202, 203, 288, 275, 354/173.1, 173.11, 212–214; 355/18, 27–29, 41, 64

[56] References Cited

U.S. PATENT DOCUMENTS

| 1,804,680 | 5/1931 | Fairchild | 354/203 |
| 2,227,240 | 12/1940 | Becker et al. | 354/171 |
| 4,049,345 | 9/1977 | Tanabe et al. | 355/41 |
| 4,094,603 | 6/1978 | Evers | 355/64 |
| 4,189,228 | 2/1980 | Farrell | 355/41 |

FOREIGN PATENT DOCUMENTS 2045449 10/1980 United Kingdom ................ 354/212

Primary Examiner—Donald A. Griffin
Attorney, Agent, or Firm—Alan Ruderman

[57] ABSTRACT

A photographic device which has a film magazine which feeds photographic film over an aperture plate has apparatus for accurately registering the center of an image frame relative to the center of the transport perforations of the film. A relatively slow moving motor drives a film take-up reel to feed film over guide sprockets to move the film one frame into close proximity with the registration position. The motor is thereafter stopped and a platen having accurately disposed truncated pyramid shaped pins directed toward the film is forced toward the film with the pins entering perforations in the film and recesses in the aperture plate. The pins act to move the film minute amounts as required as they enter the perforations to correct the position of the film to precise registration. After the frame is exposed signals are supplied to remove the platen from the film engaging position and actuate the motor for the subsequent cycle. A cam driven by one of the sprockets controls a switch which stops the motor after one frame has been fed. An electrical solenoid is utilized to remove the platen from the film engaging position and after the motor is stopped a signal is supplied to deactivate the solenoid and springs thereafter force the platen toward the film.

20 Claims, 6 Drawing Figures

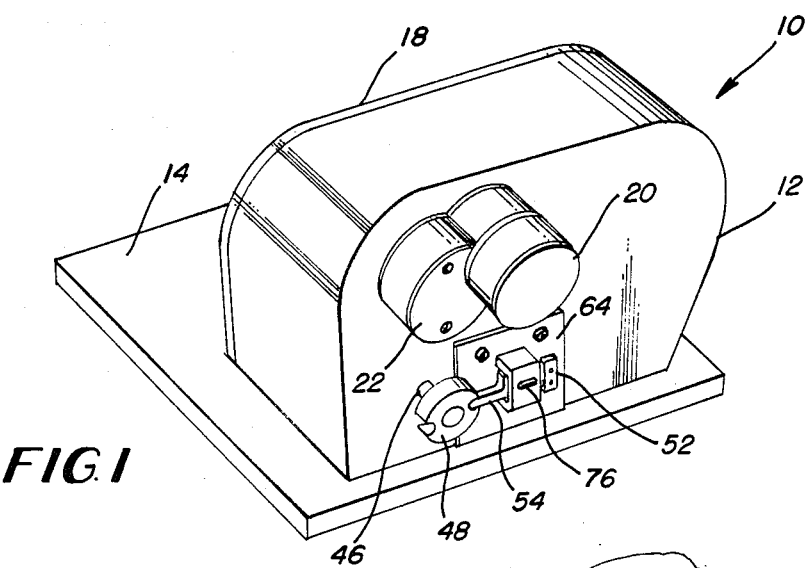
FIG.1
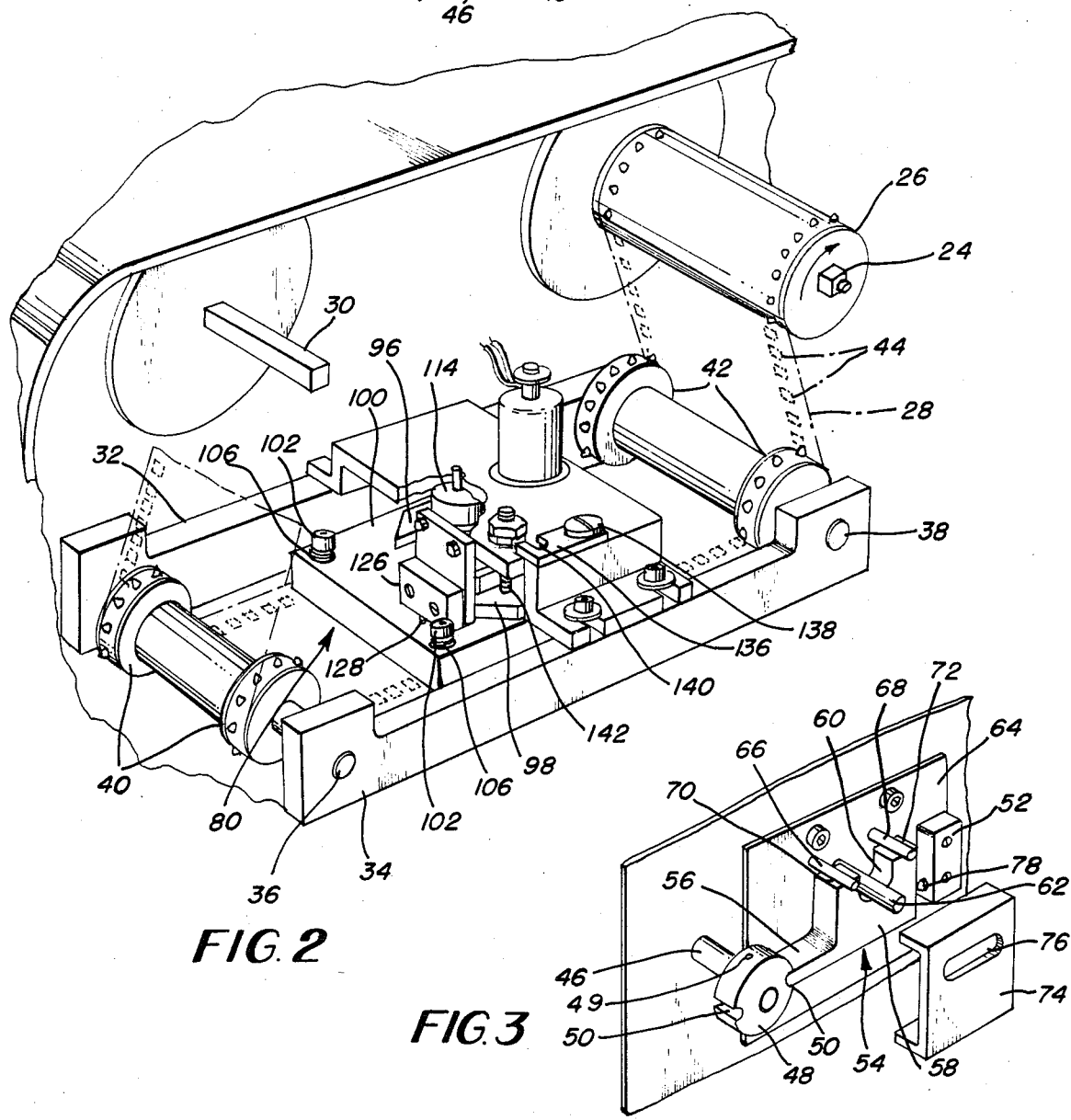
FIG.2
FIG.3

FILM MAGAZINE PIN REGISTRATION

BACKGROUND OF THE INVENTION

This invention relates to film registration relative to the aperture over which the film is transported in a photographic apparatus such as a camera or a film magazine, and more particularly to apparatus for repeatably registering the film perforations accurately relative to the center of the aperture through which images are exposed on the film so that each image is centered in relation to the perforations of a frame.

The perforations in continuous rolls of photographic film, whether a double row of perforations such as in 35 millimeter film or a single row as in 46 millimeter film, is for co-acting with sprockets to transport film through the camera, film magazine or other film transporting photographic apparatus. Pin or peg registration as it applies to such film, and considering 35 millimeter film as it is the most universally used film of this type, refers to the position of the image created on the film in relation to the perforations. The images have a direct relationship to the holes in the film and when the film is in exact registration the center of the image is centered in relation to the perforations. When registration is off, the image is off-center.

Although in most still photography (35 mm, 46 mm and 70 mm) the perforations are for the sole purpose of film transport so that misalignment can be tolerated, it has become common to use the perforations for locating images with respect to each other throughout the process for creating slides for an audiovisual slide show using a multiplicity of slide projectors showing multiple images simultaneously, and also for matching images for creating of animation, computer graphics and other presentations using multiple images. They are also used for locating the transparencies in slide frames during high speed film cutting and mounting threreof. In, for example, a multi-slide projector presentation, a misregistration of two thousands of an inch on 35 millimeter film will create approximately one quarter of an inch of misregistration on a ten foot high screen at a magnification of 130 times. Such misregistration is clearly noticable and affects the presentation. Accordingly, registration of the image placed on the film and of the image in the slide mounts is critical.

Film perforation which is standarized, is controlled at the time of manufacture, but not all registration systems use the same perforation to register the film during exposure as that used in a slide mount. One of the problems is that frame of 35 mm film has eight perforations so that a perforation is not located at the center of the frame. The prior art systems usually have the registrations pins outside the exposure frame area while the slide mount registration pins engage a perforation within the frame which is located one-half pitch away from the center of the image. Since film and the pitch change size due to humidity, aging and processing, certain deviations in registration may not be controlled, but this misregistration is amplified with a camera or other film transporting device having its registration pin or pins removed from the slide mount register pin by a relatively large number of perforations.

In certain prior art systems the registration pin or pins may be placed at various distances from the slide mount registration pin, e.g., four to eight in the known systems. Moreover, certain prior art cameras and other transporting devices have a long threading path between the feed sprocket and the registration pins and the operation thereof becomes very pitch sensitive. For example, at least one known prior art registration pin is displaced by 30 perforations from the feed sprocket which results in large potential errors in film location.

In the prior art, expensive precision mechanisms are utilized to advance the film one frame with sufficient accuracy such that subsequent pinning of a perforation with the registration pin will not damage the perforation. Such precision mechanism utilize Geneva drives, Scotch yoke devices or stopping motors which may be placed quite large distances from the center of the film frame and aperture. With pliant acetate-base film a certain amount of film pitch variation can be accommodated, but other film bases cannot and if the camera or other film transporting devices are not adjusted to the pitch of the film, damage to the film or the device can result.

Thus, it can be seen that pin registration is critical in certain applications and that the location of the registration pin relative to the center of the image, and the location of the feed sprocket relative to the registration pin are significant in attaining correct registration of the film for subsequent use in slide mounts.

SUMMARY OF THE INVENTION

Consequently, it is a primary object of the present invention to provide photographic apparatus which accurately registers the center of the image of a frame of photographic film relative to the perforations in the film.

It it another object of the present invention to provide pin registration for a photographic film transport system wherein at least one registration pin may be located closely adjacent the center of the image frame and the film transporting sprocket may be relatively close to the registration pin.

It is a further object of the present invention to provide an accurate pin registration system for centering the frame of a photographic image relative to the transport perforations in the film by driving the film one frame by a rotary motor until the film is in approximate registration and thereafter pushing an accurately disposed platen carrying the registration pins toward the film so that the pin can enter selected perforations and correct for any misregistration by slightly moving the film as the pins are seated in recesses in the film support plate.

It is a still further object of the present invention to provide a pin registration system for centering the frame of a photographic image relative to the transport perforations in the film by a relatively inexpensive drive system which intermittently drives the film one frame over an aperture plate and utilizing registration pins disposed at one half pitch from the center of the aperture, the pins being carried by a moveable platen and adapted to enter and register with perforations in the film, the platen being moved toward the film when the film has been positioned by the drive system and removed therefrom when the drive is operating.

Accordingly, the present invention provides in a camera, film magazine or the like which feeds photograhic film over an aperture plate, apparatus for accurately registering the center of an image frame relative to the center of the film perforations corresponding to the frame. The apparatus includes a motor for transporting or feeding the film one frame into close proximity with the registration position and thereafter pushing a platen having accurately disposed tapered registration pins toward the film so that the registration pins can enter the registration perforations in the films, the pins acting to move the film minute amounts as they enter the perforations to correct the position of the film to precise registration. The platen is moved in timed relationship to the transporting of the film so that the platen is spaced with the pins above the film as the film is fed by the transporting apparatus and is forced into the pin entering perforation position after the film has been positioned by the transporting apparatus.

In the preferred form of the invention a relatively slow moving motor drives the film take-up reel to feed the film over guide sprockets to move the film one frame. Thereafter, the motor is stopped and a signal is transmitted to move the platen toward the film. As the tapered pins enter the registration perforations the film may be moved slightly if the wide or base portion of the pins is not precisely centered relative to the perforations, the sprockets permitting such movement. After the frame is exposes signals are supplied to lift the platen and actuate the motor for the subsequent cycle.

The registration pins preferably are of a truncated pyramid configuration and the platen and pins are disposed so that the pins are one half pitch from the center of the aperture or image which is the same location used for slide mounts so that registration can be extremely accurate, e.g., in the order of approximately ±0.0005 inch. For 35 mm. film, two pins are utilized, one being a datum pin or registration pin and the other a free pin. The datum pin has a configuration for filing the entire perforation at one edge of the film, while the free pin longitudinally fills the perforation at the other edge from end-to-end in the direction of feed, but is slightly smaller laterally in the direction from side-to-side across the film so that lateral registration is also attained.

In the specific form of the invention a synchronous gearmotor is utilized to drive the take-up roll and thus the film which travels over a metering sprocket and an idler sprocket from the supply roll. A cam is driven by the metering sprocket and controls switch means which stop the motor and deactivates a solenoid. The solenoid is operatively connected to the platen which is resiliently biased toward the film so that upon deactivation of the solenoid the platen is forced toward the film and the pins register with the perforations. Although any desirable number of rotations of the cam can be selected for movement of the film by one frame, it is preferred that the cam make one half a turn for each frame. Thus, upon half turn of the cam and motor the motor is stopped. After the frame is exposed, the solenoid is activated and retracts the platen and pins away from the film and transmits by switch means a signal to start the motor to turn and feed another frame.

With this construction, precision is attained by the location of the platen and the pins rather than by precision drive means as in the prior art. Thus, a relatively inexpensive pin registration system is obtained which provides extremely accurate precision which conforms with slide mount registrations.

BRIEF DESCRIPTION OF THE DRAWINGS

The particular features and advantages of the invention as well as other objects will become apparent from the following description taken in connection with the accompanying drawings, in which:

FIG. 1 is a perspective view of the exterior of a film magazine incorporating the principles of the present invention;

FIG. 2 is a fragmentary perspective view looking into the film magazine illustrated in FIG. 1 with the cover removed;

FIG. 3 is a fragmentary perspective view of a portion of the drive motor control;

DESCRIPTION OF THE PREFERRED EMBODIMENT

Figure 4:
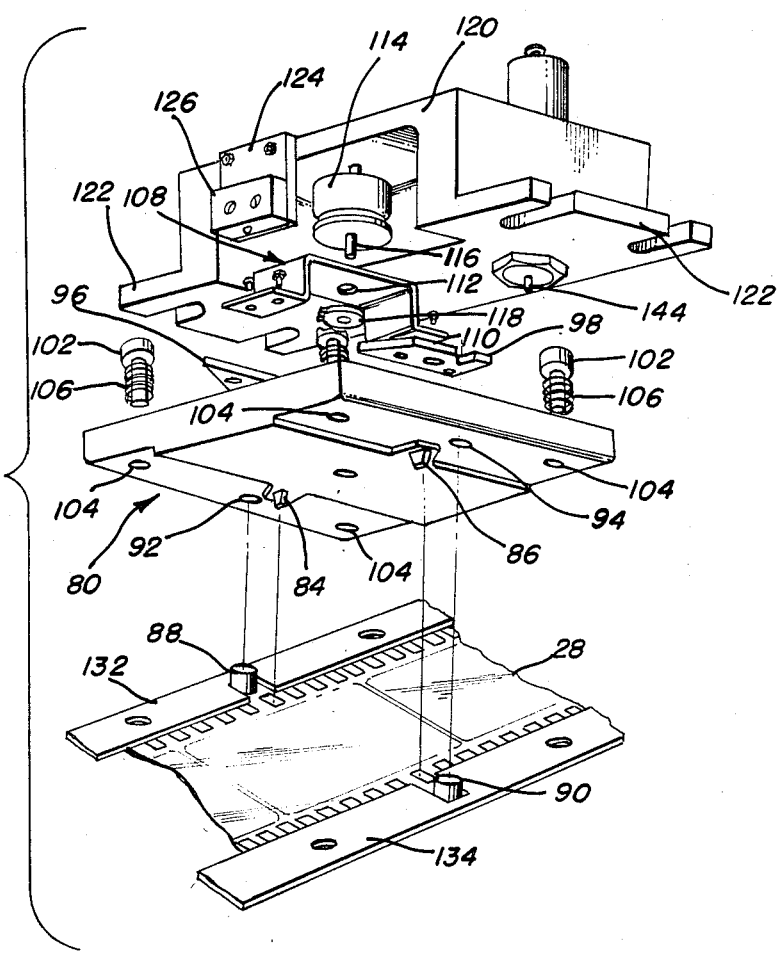
FIG. 4 is an exploded perspective view of a portion of the film registration apparatus illustrated in FIG. 2.
Figure 5:
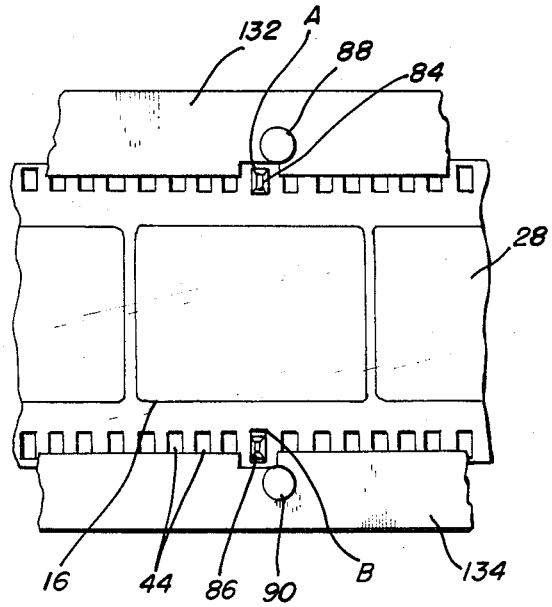
FIG. 5 is a fragmentary view of a portion of the aperture plate of the film magazine illustrating the disposition of the registration pins when engaged with the film perforations.
Figure 6:
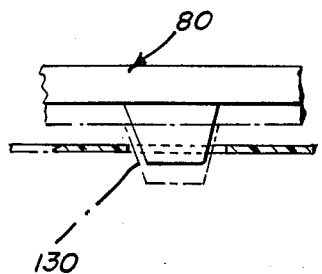
FIG. 6 is an enlarged cross sectional view taken through a registration pin illustrating entry into a perforation.

Referring now to the drawings, FIG. 1 illustrates a film magazine 10 incorporating the principles of the present invention, the magazine being viewed as looking upwardly from the bottom. As illustrated, the magazine has a housing 10 secured to an aperture plate 14 which includes an aperture 16 best illustrated in FIG. 5, the aperture plate being adapted to be fastened to a camera or the like having a shutter (not illustrated) disposed in front of the aperture. A cover 18 is removably attached to the top of the magazine housing for closing the magazine from admission of light after film is loaded therein.

Disposed on the outside of the magazine housing at the bottom is a synchronous motor 20 and a gear box 22. The gear box 22 is drivingly connected to a spindle 24 mounted inside the housing and adapted for mounting a film take-up roll or spool 26, the spool 26 being fed film 28 from a supply roll (not illustrated) which is mounted on a supply roll spindle 30 spaced from the take-up spindle. Fastened to the aperture plate 14 by screws or the like inside the housing are a pair of rails 32, 34 spaced apart laterally so that there is one rail on either lateral side of the aperture. The rails 32, 34 each have an enlarged portion adjacent each end thereof for receiving bushings which mount the shafts 36, 38 of respective sprockets 40, 42 each of which has a pair of spaced sprocket wheels adapted to register with the perforations 44 in the film 28. The sprocket 40 is an idler sprocket while the sprocket 42 is a metering sprocket which has its shaft 38 extending through the bottom of the housing 12 and is coupled to a cam shaft 46 on which a peripheral cam 48 is secured by means of a set screw 49, the cam being mounted outside the housing beneath the motor 20 and the gear box 22.

Rotation of the take-up roll 26 by means of the motor 20 effects a rotation of the metering sprocket 42 through the action of the film 28 as it is being fed past the sprocket 42 and wound onto the take-up spool. The film also rotates the idler sprocket 40 and the supply spool as it is being fed. The initial signal to drive the motor is effected by means hereinafter described. Rotation of the motor ceases, however, when a signal is supplied thereto indicating that the metering sprocket 42 has fed the equivalent of one frame of film. The signal is obtained from the cam 48. Thus, the cam 48 has at least one and preferably two notches 50 for deactivating a microswitch 52 by means of a cam follower/contactor 54 to stop the rotation of the motor 20. Although any desirable number of notches 50 may be provided it is preferred to have two so that the motor, sprocket and cam make one-half revolution for each frame that the film is fed.

The follower/contactor 54 includes a follower finger 56 for riding on the surface of the cam and for entering the notches, the finger extending from the pivot contacting portion 58. The portion 58 has an arcuate recess 60 which is disposed about a pin 62 projecting from a plate 64 fastened to the bottom wall of the housing 12. Also extending from the plate 64 are a pair of spaced pins 66, 68 which rest on arcuate surfaces 70, 72 on the contacting portion 58 above and to each side of the recess 60. A cover 74 is positioned about the pins 66, 68 and includes a slot 76 through which the pin 66 may project and on which it pivots as guided by the pins 66, 68. Adjacent the contacting portion 58 remote from the cam 48 is the microswitch 52 which includes an actuator contact 78 adapted for engagement by the contacting portion 58. Thus, as the cam rotates the follower/contactor can pivot and move into engagement with the actuator contact 78 as the finger engages the solid portion of the cam periphery and when the finger enters one of the notches, the contact 78 is disengaged and opens the circuit between the switch 52 and the motor 20 to stop the motor. This stopping of the motor occurs after the film has been fed a distance equivalent to one frame.

In order to obtain accurate registration of the center of a frame of film relative to the aperture 16 and the perforations 44 of a frame, the present invention provides a platen 80 adapted to lift away from the film and the aperture while the motor 20 is feeding film and to seat against the film overlaying the aperture after the motor is stopped, the platen carrying tapered registration pins. For a 35 mm film the platen carries a pair of pins 84, 86 spaced apart so as to register with opposite perforations in the edges of the film, but for a 46 mm film, for example, which only contains perforations along one edge of the film, the pins which preferably would be a series of three pins would be spaced for registration with the perforations along the one edge. The pins 84, 86 have a tapered or wedge configuration preferably of a truncated pyramid configuration and the pin 84, which is a datum or registration pin, at its base is substantially the same size and shape as the perforations 44 in the film so as to fill the entire perforation, and the pin 86 is a free pin which at its base fills the perforation in the end-to-end direction but is slightly smaller than the perforation in the direction transverse to the film. Thus, the pin 84 is a full fit pin along both axes while the pin 86 has a sliding fit in one axis.

The platen is aligned by a pair of posts 88, 90 upstanding from the aperture plate 14 for entering and extending through corresponding bores 92, 94 in the platen. Movement of the platen normal relative to the aperture plate is assured by use of a pair of V-blocks 96, 98 fastened to the surface 100 of the platen, that surface being opposite to the surface from which the pins 84, 86 extend, the V-blocks being disposed in guiding relationship with the posts 88, 90. The pins 84, 86 are positioned on the platen substantially at precisely one-half pitch away from the center of the aperture 16 and thus the image formed on the film frame, so that they enter registration perforations A and B which are a pair of the perforations 44 adjacent the center of the aperture, i.e., the fourth or fifth perforations in a particular frame of 35 mm film, which as aforesaid has eight such perforations per frame. Four bolster posts in the form of machine shoulder screws 102 extend through respective holes 104 in the platen 80 and are secured into the aperture plate, each screw having a small coil spring 106 disposed about the shoulder in abutment with the head of the screw and the surface 100 of the platen to bias the platen toward the aperture plate 14.

A substantially U-shaped bracket 108 having securing feet 110 is secured to the surface 100 of the platen, the bracket having a hole 112 in the central portion thereof. An electrical push-pull solenoid 114 is disposed in overlaying relationship relative to the bracket 108 and has its plunger 116 extending through the hole 112, the end of the plunger being secured to a clamp 118 so as to secure the plunger to the bracket 108 and thus to the platen 80. The remainder of the solenoid 114, i.e., the armature etc. is fastened to another larger substantially U-shaped bracket 120 which spans the rails 32, 34, the bracket 120 having feet 122 fastened to the rails. The action of the solenoid 114 is to pull the plunger into the armature when actuated so that the platen is lifted away from the aperture plate 14, and the springs 106 act to push the platen toward the aperture plate when the solenoid is deactivated. Depending from a plate 124 fastened to the bracket 120 is another microswitch 126 having its actuating contact 128 disposed so as to be engaged by the platen 80 when the latter is lifted and to be disengaged therefrom when the platen is returned toward the aperture plate 14.

The solenoid 114 is actuated to pull the platen away from the aperture plate 14 when the camera shutter or the like is actuated, and when the platen engages the microswitch contact 128 a signal is supplied to the motor 20 to feed the film one frame. After the motor is stopped by the microswitch 78 as aforesaid, and after a short time delay to ensure that feeding of the film has stopped, the electrical circuitry deactivates the solenoid 114 and the springs 106 force the platen 80 toward the film, as the pins 84 and 86 enter the registration perforations A and B on the opposite sides of the film, any misregistration is corrected as the pins begin to seat in the recess 130 in the aperture plate 14 and, as the pins fill the registration perforations in the feed direction, the film if it is not in perfect registration is pushed or pulled by the pins ever so slightly as permitted by the sprockets 40, 42. Preferably the film is pulled from the supply side by presetting the cam 48 and sprocket 40 accurately relative to the pins 84, 86. The pin 84 also ensures registration transverse to the direction of feed. To ensure that the film is not lifted when the platen is lifted by the solenoid 114, a pair of stripper plates 132, 134 are provided and are secured to the aperture plate 14 by the screws 102, and the film when loaded is positioned between the stripper plates 132, 134 and the aperture plate 14. Also provided is a platen latch 136 pivotably connected to the bracket 120 by a shoulder screw 138, the latch 136 having a slot 140 pivotably adapted to swing under a latch post 142 to hold the platen away from the aperture plate during film loading. A solenoid operated notcher 144 may be provided to make a dimple between the center of adjacent frames which can be felt in the dark during processing.

Since the platen 80, its mounting and the position of the pins 84, 86 can be acurately manufactuerd with relative ease and cost, registration precision in the order of ±0.0005 inch can be obtained without the need to use the extremely precise drive mechanisms of the prior art. As the pins 84, 86 enter the registration perforations A and B, the resiliency of the film permits the small movement and stretching of the film which positions the perforations in the frame to registration accuracy. The one-half pitch registration perforations moreover are the same as those used for slide mounts so that accuracy of registration is maintained between the image during processing of the slide from the camera to the images on the screen for multi-projection slide shows and the like.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. In a photographic device having an aperture plate including an aperture through which photographic rays may be focused onto a frame of photographic film fed longitudinally over a surface of said plate past said aperture, said film having at least one series of substantially equally spaced transport perforations adjacent a longitudinal edge thereof, the spacing between adjacent perforations being defined as the pitch, apparatus for registering each frame of film with the center of said aperture, said apparatus comprising film drive means for feeding selectively one frame of film past said aperture intermittently in seriatim, a platen having at least one registration pin extending from a face thereof, a recess formed in said aperture plate within the longitudinal confines of said frame and disposed in accurate registration relative to the center of the frame in alignment with one of said perforations, said pin and recess being disposed one-half pitch from the longitudinal center of said aperture, means for mounting said platen with said face disposed opposite said surface for movement toward and away from said aperture plate and with said pin disposed for receipt within said recess, means for moving said platen to a first position with said pin spaced from said surface of said aperture plate and film disposed thereon and for moving said platen to a second position for abutting film on said aperture plate for entry of said pin into said recess, said pin having a cross sectional configuration conforming to at least the longitudinal dimension of said perforations when disposed in said second position, whereby said pin may enter a perforation and adjust the film longitudinally as the platen reaches said second position.

2. In a photographic device as recited in claim 1, wherein said pin is tapered.

3. In a photographic device as recited in claim 2, wherein said pin has a truncated pyramid configuration.

4. The method of accurately registering a frame of a sheet of photographic film with the center of an aperture over which the film is fed, said sheet of film being an elongated strip having transport perforations spaced equally apart adjacent at least one longitudinal edge thereof, the space betweeen adjacent perforations being defined as the pitch, registration being that position where the perforations are disposed accurately relative to the center of said aperture, said method comprising feeding a length of said film equal to the length of said frame into close proximity with the registration position, and thereafter inserting a pin accurately registered one-half pitch from the longitudinal center of the frame and conforming to the size and shape of said perforations at least in the longitudinal direction through one of said perforations to move said film into registration.

5. In a photographic device having an aperture plate including an aperture through which photographic rays may be focused onto a frame of photographic film fed longitudinally over a surface of said plate past said aperture, said film having two spaced apart rows of transport perforations, the perforations in each row being substantially equally spaced apart adjacent a respective longitudinal edge of the film, apparatus for registering each frame of film with the center of said aperture, said apparatus comprising film drive means for feeding selectively one frame of film past said aperture intermittently in seriatim, a platen having two pins extending from a face thereof, one of said pins corresponding to one row of perforations and the other pin corresponding to the other row, a recess corresponding to each pin formed in said aperture plate within the longitudinal confines of said frame and disposed in accurate registation relative to the center of the frame in alignment with one of said perforations in a respective row, means for mounting said platen with said face disposed opposite said surface for movement toward and away from said aperture plate and with said pins disposed for receipt within said recesses, means for moving said platen to a first position with said pins spaced from said surface of said aperture plate and film disposed thereon and for moving said platen to a second position for abutting film on said aperture plate for entry of said pins into said recesses, one of said pins defined as a datum pin having a cross sectional configuration conforming to the size and dimension of said perforations and the other of said pins having a size and dimension conforming only to the longitudinal size and dimension of said perforations and being smaller than said perforations in the direction from row to row, whereby said pins may enter a respective perforation and register the film as the platen reaches said second position.

6. In a photographic device as recited in claim 5, wherein said drive means includes a pair of rotatably journalled sprocket members spaced apart longitudinally from each other and from said aperture, each of said sprocket members having teeth adapted to register with said perforations, cam means driven by one of said sprocket members for stopping the feeding of said film after one frame has been fed.

7. In a photographic device as recited in claim 6, wherein said film is fed between a supply spool and a take-up spool on which film is wound, said drive means including electrical motor means for driving said take-up spool to pull film past and rotate said one of said sprocket members, and switch means controlled by said cam means for stopping said motor after one frame has been fed.

8. In a photographic device as recited in claim 7, wherein the spacing between adjacent perforations is defined as the pitch, and said pin and recess are disposed one-half pitch from the longitudinal center of said aperture.

9. In a photographic device as recited in claim 7, wherein said pin is tapered.

10. In a photographic device as recited in claim 9, wherein said pin has a truncated pyramid configuration.

11. In a photographic device as recited in claim 5, wherein said means for moving said platen to said first position comprises an electrical solenoid operatively connected to said platen for pulling said platen away from said aperture plate upon selective actuation of said solenoid, said spring means for moving said platen to said second position upon deactuation of said solenoid.

12. In a photographic device as recited in claim 11, wherein said film is fed between a supply spool and a take-up spool on which film is wound, said drive means including electrical motor means for driving said take-up spool to pull film from said supply spool switch disposed for closure when said platen is in said first position for providing a signal to start said motor.

13. In a photographic device as recited in claim 12, wherein said drive means includes cam means driven in timed relationship with the feeding of said film, second switch means controlled by said cam means for stopping said motor after one frame has been fed.

14. In a photographic device as recited in claim 13, wherein said drive means further includes a pair of rotatably journalled sprocket members spaced apart longitudinally from each other and from said aperture, each of said sprocket members having teeth adapted to register with said perforations, and means for drivingly connecting one of said sprocket members to said cam.

15. In a photographic device as recited in claim 11, wherein the spacing between adjacent perforations is defined as the pitch, and said pin and recess are disposed one-half pitch from the longitudinal center of said aperture.

16. In a photographic device as recited in claim 11, including stripper plate means disposed between said aperture plate and said platen and adapted to hold said film against movement with said platen as said platen is moved to said first position.

17. In a photographic device as recited in claim 5, wherein the spacing between adjacent perforations is defined as the pitch, and said pin and recess are disposed one-half pitch from the longitudinal center of said aperture.

18. In a photographic device as recited in claim 5, including stripper plate means disposed between said aperture plate and said platen and adapted to hold said film against movement with said platen as said platen is moved to said first position.

19. The method of accurately registering a frame of a sheet of photographic film with the center of an aperture over which the film is fed, said sheet of film being an elongated strip having a row of transport perforations spaced equally apart adjacent each longitudinal edge thereof, registration being that position where the perforations are disposed accurately relative to the center of said aperture, said method comprising feeding a length of said film equal to the length of said frame into close proximity with the registration position, and thereafter inserting a pin accurately registered relative to the center of the frame through one of said perforations in each row, a pin inserted into a perforation in one for conforming to the size and shape of said perforations in both the longitudinal direction and the transverse direction and the other pin conforming to the size and shape of said perforations only in the longitudinal direction and being smaller than the perforations in the transverse direction so that the film can be moved into registration along two axes.

20. In the method as recited in claim 19, wherein the spaced between adjacent perforations in both rows is defined as the pitch, and said pins are disposed one-half pitch from the center of the frame.

* * * * *